United States Patent [19]

Bestgen

[11] Patent Number: 5,102,493

[45] Date of Patent: Apr. 7, 1992

[54] STRIP TAPE

[76] Inventor: William Bestgen, 208 Roosevelt St., Lead, S. Dak. 57754

[21] Appl. No.: 471,527

[22] Filed: Jan. 29, 1990

[51] Int. Cl.⁵ .............................................. B26F 3/02
[52] U.S. Cl. ..................................... 156/584; 225/38; 225/54
[58] Field of Search .................. 225/54, 37, 38, 91, 225/34; 428/42; 134/4; 156/527, 584; 221/73

[56] References Cited

U.S. PATENT DOCUMENTS

| Re. 32,010 | 10/1985 | Collins | 156/527 |
|---|---|---|---|
| 2,373,092 | 4/1945 | Avery | 225/54 |
| 2,725,244 | 11/1955 | Friday | 225/54 |
| 2,758,710 | 8/1956 | Arens | 225/54 |
| 3,050,224 | 8/1962 | Drolschammer | 225/54 |
| 3,149,364 | 9/1964 | Baptist et al. | 134/4 |
| 3,950,185 | 4/1976 | Toyama et al. | 134/38 |
| 4,447,482 | 5/1984 | Heinzelman et al. | 428/42 |
| 4,502,891 | 3/1985 | Brocklehurst et al. | 134/4 |
| 4,639,327 | 1/1987 | McGaha | 252/143 |

Primary Examiner—Frank T. Yost
Assistant Examiner—John M. Husar
Attorney, Agent, or Firm—Terry M. Gernstein

[57] ABSTRACT

A paint removing substance is mounted on an elongated backing member and a cover sheet is removably mounted on top of the substance. The backing member and cover are helically wound onto a reel and stored in a dispensing container. The container includes two dispensing openings, one for the paint-removing substance containing backing member, and one for the cover sheet. Some portions of the backing member are free of paint-removing substance and adhesive material is located in those areas whereby the tape can be removably affixed to the paint containing substrate.

9 Claims, 2 Drawing Sheets

STRIP TAPE

FIELD OF THE INVENTION

The present invention relates to the general art of removing film-like substances from a substrate, and to the particular field of removing paint-like materials from substrates.

BACKGROUND OF THE INVENTION

Many remodeling jobs require the removal of old paint from various surfaces, such as walls or the like. Stripping old paint from such surfaces can be an onerous task, and thus the art has proposed many forms of paint strippers.

These paint strippers range from general and special tools, such as simple scrapers and heat guns, to special paint removing compositions, such as disclosed in U.S. Pat. Nos. 3,950,185 and 4,639,327, the disclosures of both patents being incorporated herein by reference.

While successful in many situations, these known methods and means have drawbacks such as cost, ease of use and safety.

A particularly serious drawback of these known means and methods occurs when a difficult-to reach area, such as a tight corner or a crack, or an area adjacent to a door or window, must be stripped. The heat guns, for example, may not be adapted for use in such tight areas, and thus will not be as effective as possible.

The compounds such as are disclosed in the aforementioned incorporated patents, can be difficult and unwieldy to use. This is particularly so if the substance must be applied in one step and one or more additional steps must be used to complete the stripper application and paint removal process. While such multi-step processes may not be difficult in open areas, they can prove to be particularly onerous in tight, hard-to-reach areas. The tight area must be worked numerous times to complete the process, thereby multiplying the difficulties associated with working in such an area.

Accordingly, there is a need for a paint remover that can be easily used in hard-to reach areas.

OBJECTS OF THE INVENTION

It is a main object of the present invention to provide a paint stripper that is easily used in tight, hard-to-reach areas, such as corners and the like.

It is another object of the present invention to provide a paint stripper that is conveniently stored and dispensed.

SUMMARY OF THE INVENTION

These, and other, objects are accomplished by providing a strip tape like material with a layer of paint-removing compound and storing that tape in a dispensing container that is similar to those dispensing containers used to store and dispense adhesive tape. A cover is releasably mounted on the tape to cover the paint-removing compound.

The tape has a width and an undefined length, and the paint remover is located along the lengthwise axis of the tape, but only covers a portion of the width of that tape so that paint remover free marginal areas are located on both sides of the paint remover substance. These marginal areas have adhesive therein to affix the tape to the painted surface.

The dispensing container has two dispensing openings defined in a wall thereof, with the paint-remover containing tape moving through one of the openings and the release cover moving through the other opening. In this manner, the tape is dispensed in a ready-to-use condition but will be stored in the container in a covered condition.

The tape is approximately as wide as masking tape and is used in the manner of masking tape. That is, the tape is applied in the corners or on top of the paint to be removed, and the adhesive on the tape holds the paint remover containing tape to the painted surface.

Thus, paint remover can be applied as easily as masking tape, which is commonly used in tight, hard-to-reach areas. Thus, the paint remover is quite easily used in such areas.

DETAILED DESCRIPTION OF A PREFERRED EMBODIMENT OF THE INVENTION

Figure 1:
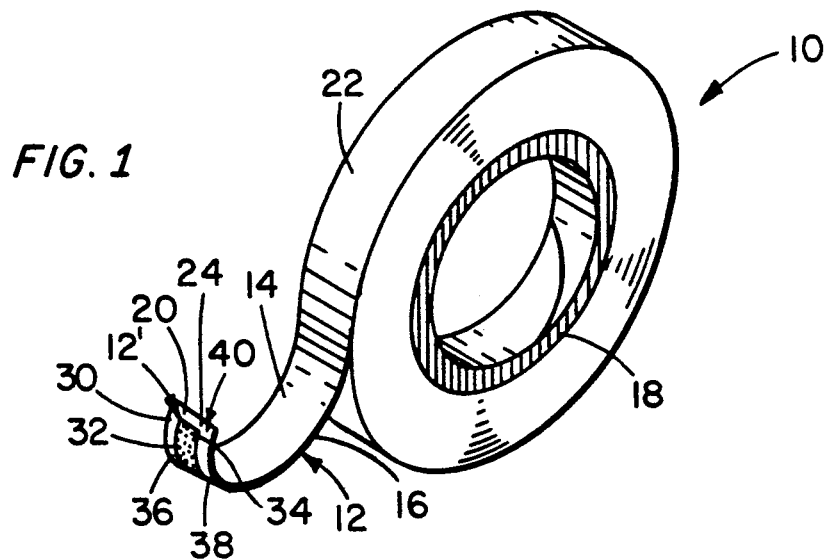
FIG. 1 shows a roll of strip tape having paint remover thereon in accordance with the teaching of the present invention.

Shown in FIG. 1 is a roll 10 of strip tape 12. The strip tape 12 is flexible and resembles masking tape. That is, the tape 12 has a width as measured between longitudinal side edges 14 and 16 that is as little as one inch or as much as four or five inches, and a length that is undefined. The tape is helically wound onto a reel 18 that is plastic or the like to be unwound therefrom in the manner of masking or adhesive tape. The tape will have a leading edge 20, a top surface 22 and an undersurface 24. As is the case in helically wound elements, the undersurface 24 will contact the top surface 22 in the rolled up configuration of the tape.

Fixedly mounted on the tape undersurface 24 is a layer of paint removing substance 30, such as disclosed in various U.S. patents, such as the incorporated U.S. Pat. No. 3,950,185. This substance 30 has a width as measured between its longitudinal side edges 32 and 34 that is less than the width of the tape 12 to define marginal areas 36 and 38 on both sides of the substance. The substance 30 also has a length substantially equal to that of the tape 12 and extends along the longitudinal axis of that tape 12.

An adhesive type substance 40, such as contact glue or the like, is located in the marginal areas 36 and 38. This substance serves to fix the tape 12, with the substance 30 thereon, to the painted surface which is to have the paint removed therefrom.

A release cover 42 (best shown in FIG. 2) is mounted on the undersurface 24 to cover the substance 30 and the adhesive material to prevent such materials from drying out during storage or from adhering to the rolled up tape.

After affixing the tape 12 to the painted surface, the substance 30 works to remove the paint, and the tape 12 can be removed by simply pulling it off in the manner of adhesive tape or masking tape. The adhesive covered marginal areas 36 and/or 38 can be adhered to areas adjacent to the painted area being treated. For example, if a corner is to have the paint removed, one of the marginal areas can be affixed to the wall adjacent to the corner.

An alternative form of the tape will have only one marginal area that is free of paint-removing, with the remaining area of the tape being covered by such paint-removing substance so that certain areas can be reached. The adhesive can be located over the entire area of such substance-free location, or can be located in selected spots thereof. Such an alternative form is indicated in FIG. 1 by the reference indicator 12'. Various spots of paint remover can be positioned along the length of the tape, even in the margins 36 and 38, or in the margin of the just-discussed alternative embodiments, if desired.

Figure 2:
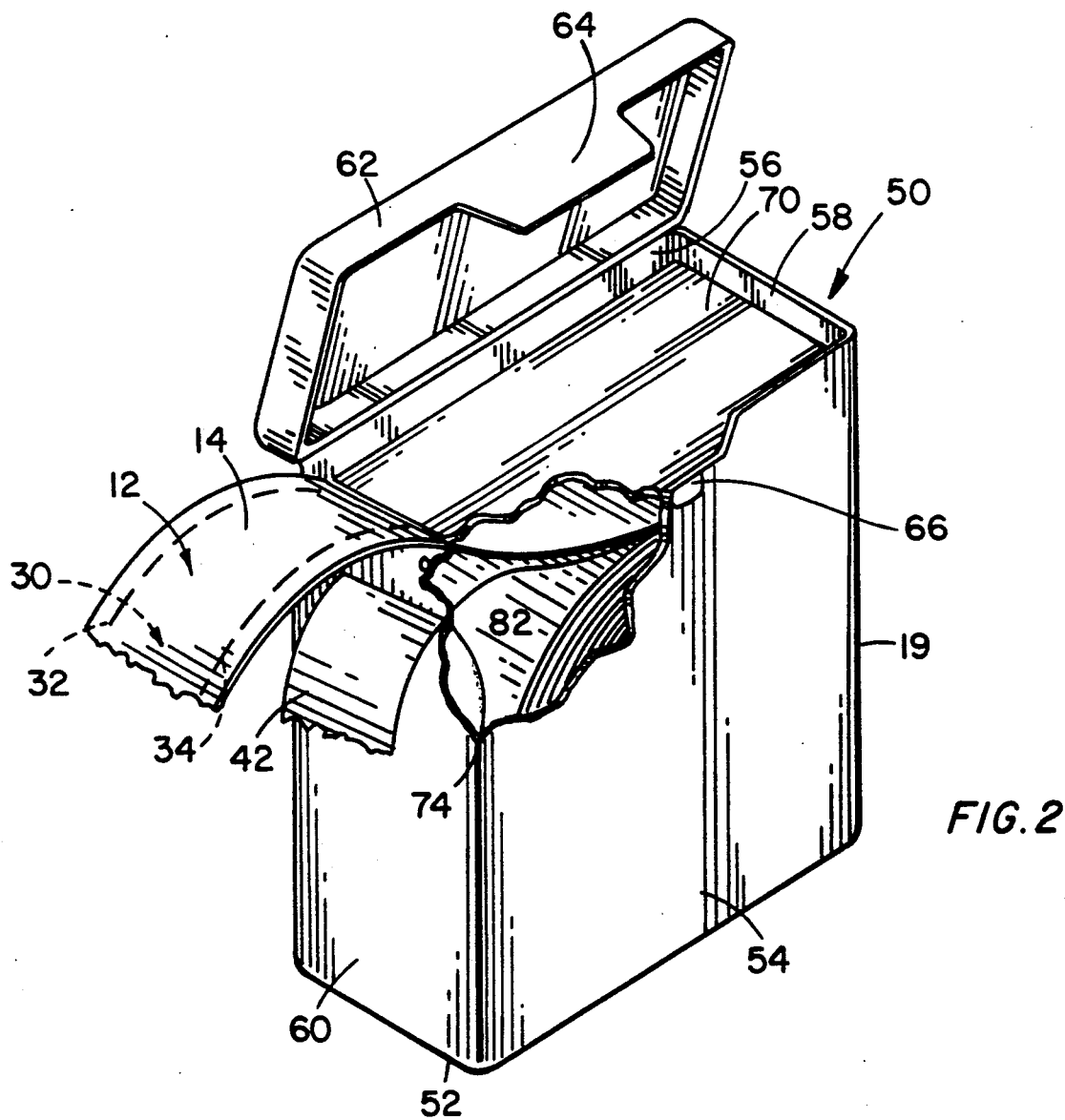
FIG. 2 shows a dispensing container for the paint remover containing strip tape of the present invention.
Figure 3:
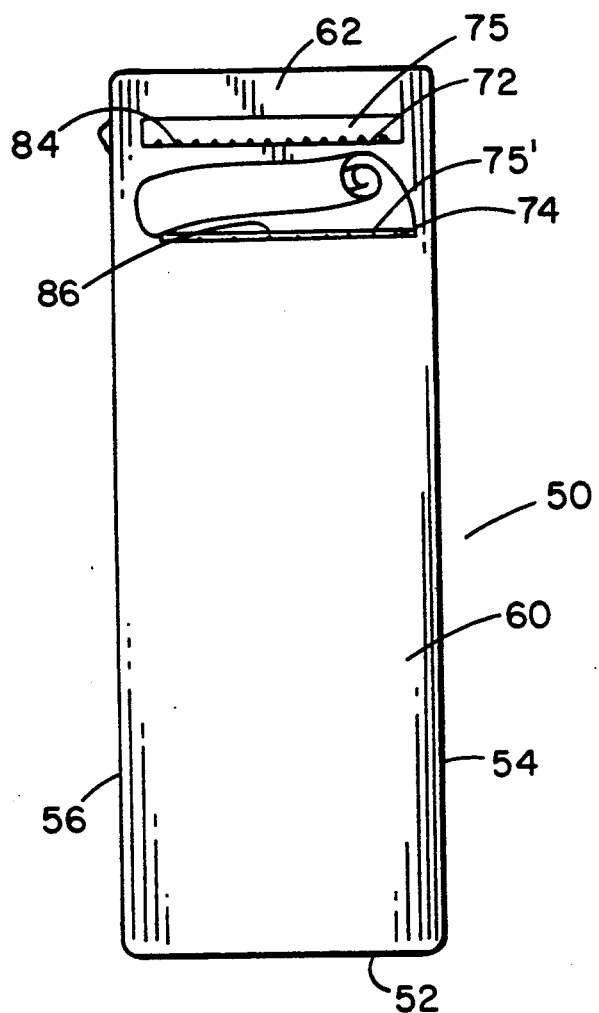
FIG. 3 is an end elevation showing one end of the FIG. 2 dispensing container.

Referring to FIGS. 2 and 3, a dispensing container 50 for storing and dispensing the tape 12 is shown. The dispensing container 50 is box-like and includes a bottom 52 with a front wall 54, a rear wall 56 and end walls 58 and 60 upstandingly surrounding that bottom and connecting the end walls together. The container 50 includes a top 62 that is hingeably attached to the container rear wall and has a latch 64 which co-operates with a latch plate 66 on the front wall to lock the top closed.

The container 50 is hollow to have a chamber defined therein, and the reel-mounted tape 12 is located in that chamber. The reel 18 is mounted on a cylindrical mount 19 for rotation about an axis of the helically wound tape in the manner of masking tape or the like.

A plate-like cover 70 closes the chamber in which the reel-mounted tape is stored.

As is shown in FIGS. 2 and 3, the end wall 60 has two adjacent dispensing openings 72 and 74 defined therein. The paint remover substance containing tape is dispensed through the opening 72 and the cover 42 is dispensed through the opening 74 that is located subadjacent to the opening 72. A guide bar 82 is mounted on the inner surface of the end wall 60 to be located to divide the cover 42 front the remainder of the tape and to guide such cover out of the opening 74 as is shown in FIG. 2.

The container 50 is air-tight so that the substance 30 is not exposed to air during storage. The container is therefore formed of plastics-type or metal material. The cover 42 serves to prevent exposure of the substance 30 to air, and is removed at the last possible moment prior to use by the dual dispensing opening and guide bar arrangement of the container 50. However, due to the dual dispensing opening arrangement, the tape can be used in an easy and expeditious manner. The openings 72 and 74 are as small as possible, and, in one form of the container, include flexible covers to keep these openings closed so the container remains air tight. The flexible nature of the covers used over openings 72 and 74 permits the tape to be drawn through the opening 72 without removing the substance 30 or the adhesive 40 therefrom. A cover 75 is indicated in FIG. 3 in association with opening 72, and a cover 75' is indicated in association with opening 74. Any small amount of air moving past covers 75 and 75' will not significantly affect the tape, especially in view of the cover plate 70.

In this manner, removal of the cover 42 from a covering position on top of the substance 30 is ensured as the tape is dispensed; whereas, the cover 42 will remain in covering relationship with the substance 30 during storage of the tape 12 in the container 50.

The plate 70 can be removed to insert another roll of tape 12 after one roll has been exhausted, or to change from tape 12 to a tape containing the adhesive in areas 12' as above discussed.

As indicated in FIG. 3, tape cutting edges 84 and 86 are positioned on the end wall adjacent to the dispensing openings 72 and 74 to cut the tape and the cover after a desired amount of the tape has been dispensed.

Thus, the tape 12 is applied to a desired area by simply applying a leading edge 20 to the desired area, pressing the tape down onto the desired area or adjacent thereto to adhere the adhesive to the substrate, and pull the tape out of the container 50. The release cover 42 is automatically removed and the adhesive in the marginal areas causes the tape to adhere to the substrate with the paint removing substance contacting the paint to be removed. The paint is removed by simply removing the tape 12 after waiting a suitable time for the substance to accomplish its work on the paint.

The tape can be inserted into cracks and applied to odd-shaped objects, and can include a wide variety of special substances that are designed for specific paint, shellack, varnish, urethane or the like. Suitable substances in addition to those disclosed in the incorporated patents include acetone, toluol, methylene, methylene chloride and petroleum distillates. The container 50 can be air-tight to ensure the integrity of the substance 30, and the plate 70 is used to accomplish this object, along with suitable covers for the openings 72 and 74. The backing for the substance can be fabric-like materials or the like, and the cover 42 can be any suitable plastic-like material. Various widths of the tape can also be used as necessary for the particular application desired.

It is to be understood that while certain forms of the present invention have been illustrated and described herein, it is not to be limited to the specific forms or arrangement of parts described and shown.

I claim:

1. A combination dispenser and strip tape for removing paint-like materials from substrates comprising:
   a reel;
   a backing which has side edges and a width measured between said side edges, said width being between one inch and five inches, said backing material having end edges and a length measured between said end edges;
   a paint-like material removing substance on said backing material, said substance being located in a central portion of said backing material and having side edges spaced from said backing side edges and a width measured between said substance side edges that is less than the width of said backing, said substance extending for the entire length of said backing;
   marginal sections of said backing on either side of said substance between said substance side edges and said backing side edges, said marginal sections extending for the entire length of said backing and each having a width measured from a substance side edge to an adjacent backing side edge and being free of said paint-like material removing substance;
   adhesive material on said marginal sections of said backing, said adhesive material being covered by said release cover;
   said backing, said paint-like material removing substance and said release cover all being helically wound onto said reel.

2. The combination dispenser and strip tape defined in claim 1 further including a dispensing container having a wall, said container including a reel mount and two dispensing openings defined in said wall, said openings being located adjacent to each other and located so that one opening accommodates said backing and the other opening accommodates said release cover.

3. The combination dispenser and strip tape defined in claim 2 further including cutting means on said wall adjacent to said one opening.

4. The combination dispenser and strip tape defined in claim 3 further including a second cutting means on said wall adjacent to said other opening.

5. The combination dispenser and strip tape defined in claim 4 further including a cover plate affixed to said wall in said container.

6. The combination dispenser and strip tape defined in claim 5 wherein said container is air tight.

7. The combination dispenser and strip tape defined in claim 6 further including a flexible covering means covering each of said dispensing openings.

8. The combination dispenser and strip tape defined in claim 7 wherein further portions of adhesive material are located at selected locations in said margins.

9. The combination dispenser and strip tape defined in claim 8 further including a guide bar mounted on said container between said dispensing openings.

* * * * *